(12) United States Patent
Bouchet

(10) Patent No.: US 11,618,499 B2
(45) Date of Patent: Apr. 4, 2023

(54) METHOD FOR COMPENSATING FOR A BRAKE TORQUE IN THE EVENT OF A SHORT-CIRCUIT FAILURE IN THE POWER INVERTER OF AN ASSIST MOTOR

(71) Applicant: JTEKT EUROPE, Irigny (FR)

(72) Inventor: Arnaud Bouchet, Oullins (FR)

(73) Assignee: JTEKT EUROPE, Irigny (FR)

( * ) Notice: Subject to any disclaimer, the term of this patent is extended or adjusted under 35 U.S.C. 154(b) by 246 days.

(21) Appl. No.: 16/975,247

(22) PCT Filed: Feb. 21, 2019

(86) PCT No.: PCT/FR2019/050399
§ 371 (c)(1),
(2) Date: Aug. 24, 2020

(87) PCT Pub. No.: WO2019/162622
PCT Pub. Date: Aug. 29, 2019

(65) Prior Publication Data
US 2020/0398890 A1 Dec. 24, 2020

(30) Foreign Application Priority Data
Feb. 22, 2018 (FR) .................... 18/51525

(51) Int. Cl.
*B62D 5/04* (2006.01)
(52) U.S. Cl.
CPC ......... *B62D 5/0484* (2013.01); *B62D 5/0463* (2013.01); *B62D 5/0487* (2013.01)
(58) Field of Classification Search
CPC ....................................................... H02P 6/08
See application file for complete search history.

(56) References Cited

U.S. PATENT DOCUMENTS

| | | | |
|---|---|---|---|
| 2012/0145472 A1 | 6/2012 | Imamura et al. | |
| 2014/0246999 A1* | 9/2014 | Kezobo | B60L 3/0061 318/400.23 |
| 2016/0006387 A1* | 1/2016 | Nakamura | B62D 5/0463 701/43 |
| 2016/0118923 A1* | 4/2016 | Kano | H02K 3/28 310/198 |
| 2017/0012569 A1* | 1/2017 | Koseki | H02P 25/22 |
| 2017/0217480 A1 | 8/2017 | Skellenger et al. | |

FOREIGN PATENT DOCUMENTS

| | | | |
|---|---|---|---|
| DE | 10 2011 121602 A1 | | 6/2013 |
| JP | 2006-158182 A | | 6/2006 |
| WO | 2007/129359 A1 | | 11/2007 |

OTHER PUBLICATIONS

Apr. 18, 2019 International Search Report issued in International Patent Application No. PCT/FR2019/050399.

* cited by examiner

*Primary Examiner* — Jeff A Burke
*Assistant Examiner* — Jerrod Irvin Davis
(74) *Attorney, Agent, or Firm* — Oliff PLC

(57) ABSTRACT

A method for controlling a power steering system of a vehicle, having a steering wheel, and an inverter powering an assist motor, when a short-circuit failure is detected between a phase of the assist motor and an electric line of the inverter, wherein it includes:—a configuration step intended to determine, for a magnetic field of the assist motor, a controllable zone and a non-controllable zone,—a step of compensating for a space-average brake torque in the controllable zone.

9 Claims, 3 Drawing Sheets

METHOD FOR COMPENSATING FOR A BRAKE TORQUE IN THE EVENT OF A SHORT-CIRCUIT FAILURE IN THE POWER INVERTER OF AN ASSIST MOTOR

The invention concerns the field of power steering systems of a vehicle and more particularly a method for driving a power steering system during a short-circuit type failure between a phase of an assist motor and power line of an inverter.

The object of a vehicle power steering system is to allow a driver to control a vehicle trajectory by exerting a force on a steering wheel.

Generally, a steering system comprises several elements whose said steering wheel connected to a steering column, a rack, and two wheels each connected to a rod. The rack is the part making it possible to connect the steering wheel, via the steering column, to the wheels, via the rods; that is to say that the rack transforms the forces exerted by the driver on the steering wheel into a rotation of the wheels of the vehicle.

An electric power steering system in a vehicle uses an assist motor, driven by a steering computer, to reduce the effort required by the driver on the steering wheel to turn the wheels of the vehicle. Depending on the forces exerted on the steering wheel, that is to say the steering wheel torque, the assist motor exerts an assistance effort, that is to say a motor torque, on the rack so as to turn the wheels.

Subsequently, it will be considered that the assist motor is a three-phase synchronous motor with excited rotor or permanent magnet supplied by three phases respectively designated by U, V and W in the following description.

An inverter contains three power lines whose each of the potions of the electric lines related to the ground of the inverter will be qualified as «low side» and each of the portions of the electric lines related to the supply of the inverter will be qualified as «high side». Each electric line includes on the «low side» portion a first switching cell of the MOSFET type, qualified as «low side» and on the «high side» portion a second switching cell of the MOSFET type, called «high side», according to a diagram known to those skilled in the art.

The phases of the assist motor are supplied by the electric lines of the inverter. More particularly, each phase is connected to an electric line between the «low side» switching cell and the «high side» switching cell.

The inverter determines a direction of rotation, a speed and the motor torque of the assist motor.

During the operation of the power steering system, a short-circuit type failure may appear between a phase of the assist motor and an electric line of the inverter. Generally, this type of failure appears during a failure of a switching cell.

When a short-circuit type failure is detected in the power steering system, the assist motor is no longer driven by the inverter which is positioned in a deactivated state, that is to say a state in which all the switching cells are no longer subjected to a voltage.

A current induced by electromotive forces during the rotation of the motor is then created causing a brake torque at the level of the assist motor. Thus, the brake torque is opposed to a rotation of the steering wheel by increasing the effort required by the driver to turn the steering wheel. The driver will therefore have a feeling similar to a steering wheel block.

Automotive suppliers prevent the creation of said brake torque by adding an opening circuit at the level of the phases of the assist motor. The opening circuits are mainly composed of electromechanical or static relays which increase the cost, the volume and the ground of the power steering. Furthermore, these additional relays increase the risk of a material failure and therefore decrease the overall reliability of the power steering system.

The object of the invention is to remedy all or part of the aforementioned drawbacks by proposing a method for driving a power steering system of a vehicle, comprising a steering wheel, and an inverter electrically supplying an assist motor, when a short-circuit type failure is detected between a phase of the assist motor and an electric line of the inverter, characterized in that it comprises:
  a configuration step intended to determine, for a magnetic field of the assist motor, a controllable zone and a non-controllable zone,
  a step of compensating a spatial average brake torque in the controllable zone.

The assist motor connected to the inverter comprises three phases. A short-circuit type failure puts a phase of the assist motor in contact with a «low side» portion or a «high side» portion of an inverter supply line. Thus, the phase concerned by the failure can no longer ensure a normal power supply of the assist motor, that is to say that said phase can no longer be monitored so as to create a uniform magnetic field of the assist motor. However, two phases continue to normally operate.

Thus, a short-circuit type failure leads to an inability to monitor the magnetic field of the assist motor on a full electric revolution. A controllable zone and a non-controllable zone can then be defined on an electric revolution characterized by an electrical angle depending on the short-circuited phase, on the «low side» or «high side» portion in short-circuit, of a direction and a rotational speed of the assist motor.

The configuration step transmits the characteristics of the controllable zone and the non-controllable zone via an output signal.

Furthermore, a short-circuit type failure, via electromotive forces created during a rotation of the assist motor, induces a brake torque.

A spatial average brake torque is a brake torque exerted on the assist motor averaged over an electric revolution. More generally, a spatial average quantity is defined as the electrical quantity of the assist motor averaged over an electric revolution. These spatial average quantities only make sense when the assist motor is in rotation.

Thus, the method consists in driving the assist motor with an average motor torque so as to provide an average motor torque on the controllable zone that is strictly greater than the brake torque exerted on the non-controllable zone. On the controllable zone, the average motor torque is greater than or equal to the average motor torque exerted in a normal situation as a function of a steering wheel torque to which the estimated spatial average brake torque is added. In the non-controllable zone, only the brake torque is exerted.

The estimated spatial average brake torque can have a fixed or variable value depending on whether the power steering system comprises open loop or closed loop monitoring.

In the case of an open loop monitoring, the estimated spatial average brake torque is assumed to be constant, for example it may correspond substantially to a maximum value of the spatial average brake torque that can be exerted on the assist motor. Indeed, when the estimated spatial average brake torque is fixed, the additional average motor torque, corresponding to the difference between the spatial average brake torque assumed to be constant and the real spatial average brake torque, will be partly dissipated in the following non-controllable zone by a combination of the real spatial average brake torque and by rack efforts opposing the movement.

In the case of a closed loop monitoring, the estimated spatial brake torque is calculated from the measurement of phase currents and the electrical angle. When the spatial average brake torque is calculated, the average motor torque provided on the controllable zone is at least equal to the brake torque exerted on the non-controllable zone.

The motor torque, and therefore the steering wheel torque, is therefore not homogeneous on an electric revolution but exhibits variations between the controllable zone and the non-controllable zone. However, with the described method, a driver does not feel the impression of a steering wheel block. The driver can then place the vehicle in a situation guaranteeing its safety before carrying out repairs.

According to one characteristic of the invention, the method comprises an activation step comparing a direction of rotation of the steering wheel with a direction of rotation of the assist motor.

The «short-circuit» type failure degrades the normal operation of the assist motor which can no longer autonomously pass from a static state to a rotating state. The assist motor must be «started», that is to say put in rotation, by a rotation of the steering wheel carried out by the driver for example or by a natural return of the vehicle. At low rotation speed of the assist motor, the spatial average brake torque is very low so that it is not sensitive for the driver.

The activation step verifies that the direction of rotation of the steering wheel has a direction identical to the direction of rotation of the assist motor in order to authorize the performance of the compensation step.

Thus, the compensation step can only be carried out when the assist motor is already rotating in a direction identical to the direction of rotation of the steering wheel in order to support a driver in his intention to turn.

According to a characteristic of the invention, the activation step compares a steering wheel torque and/or a speed of the assist motor with a predetermined threshold.

The method causes a variation in the motor torque and therefore in the steering wheel torque between the controllable zone and the uncontrollable zone. However, the variation in the steering wheel torque felt is reduced on high steering wheel torques and/or on high speeds of the assist motor, that is to say greater than a predetermined threshold. Indeed, the frequency of variations in the steering wheel torque felt is directly proportional to the speed of rotation of the assist motor.

Furthermore, the variation in the felt steering wheel torque is reduced by a reduction system of the power steering system as well as by an intrinsic torsion of certain elements of the power steering system. An increase in the number of pole pairs of the assist motor, a decrease in the stiffness of the power steering system or an increase in the reduction ratio are advantageous parameters for improving the homogeneous feeling of the steering wheel torque.

Thus, the method ensures a substantially homogeneous felt steering wheel torque by considering a phase of the assist motor in short circuit with a supply line of the inverter, the other phases and the other supply lines being functional. The felt steering wheel torque is more particularly homogeneous when the estimated spatial brake torque is variable.

According to a characteristic of the invention, the configuration step determines two phases of the assist motor not influenced by the failure.

Thus, the method uses an identical strategy in the case of a short-circuit type failure with different configuration parameters depending on the characteristics of the failure, that is to say the phase in failure and the portion of the electric line.

According to a characteristic of the invention, the compensation step comprises:
  a phase for detecting a relative electrical position of the assist motor with respect to the controllable zone,
  a phase for determining a spatial average motor torque as a function of the measured steering wheel torque,
  a phase for converting the spatial average motor torque into an instantaneous motor torque,
  a phase for controlling the assist motor phase currents.

The detection phase receives as input a measured electrical angle, a measured speed of rotation of the assist motor and data relative to the controllable zone and to the non-controllable zone determined by the configuration step.

Preferably, the detection phase determines the unsigned electrical position of the assist motor with respect to the entrance to the controllable zone.

The detection phase also defines a direction of the torque of the steering wheel torque useful for switching the inverter to be adopted as a function of the direction of rotation of the assist motor.

We call inverter switching, a set of positions of the six switching cells of the inverter. The switching cells can take an open or closed position.

The determination phase makes it possible to estimate the spatial average motor torque to be exerted on the assist motor as a function of the measured steering torque.

The conversion phase receives as input the spatial average motor torque and the relative electrical position of the assist motor so as to determine the instantaneous motor torque to be exerted on the assist motor.

Finally, the control phase receives the instantaneous motor torque, the direction of the assist torque and the phases of the assist motor not degraded by the failure so as to control the assist motor via the two functional phases. The role of the control phase is to reproduce the profile of the instantaneous motor torque in the controllable zone by means of vector monitoring of the currents in the Park/Clarke reference marks, known to those skilled in the art.

According to one characteristic of the invention, the detection phase triggers an implementation of the phase for determining a spatial average motor torque.

Thus, the detection phase allows the determination step to be carried out each time the assist motor enters the controllable zone.

According to one characteristic of the invention, the conversion phase implements a setpoint curve representing the instantaneous motor torque as a function of the relative electrical position of the assist motor with respect to the controllable zone.

Thus the instantaneous motor torque has a distribution dependent on the relative electrical position of the assist motor with respect to the controllable zone. The distribution can follow a niche curve or a half sine curve centered on the controllable zone for example.

The setpoint curve is adjustable so that the instantaneous motor torque integrated in the controllable zone is equal to the spatial average motor torque.

According to one characteristic of the invention, the control phase successively uses a switching, called «deactivated inverter switching», a first switching group, and a second switching group to carry out vector monitoring of the phase currents.

When the assist motor enters the non-controllable zone, the inverter switching cells are put into a state corresponding to the inverter deactivated switching, that is to say that all of the switching cells are in an open state.

When the assist motor enters the controllable zone, the switching cells of the inverter are successively put into two possible states depending on the failure.

According to one characteristic of the invention, the driving method comprises a step of estimating the spatial average brake torque induced by the failure in the non-controllable zone.

The spatial average brake torque induced by the failure in the non-controllable zone is the actual spatial average brake torque.

Thus in the case of a closed loop monitoring, the estimated spatial average brake torque is calculated from the currents of the available phases, the electrical angle and the speed of rotation of the assist motor. The estimated spatial average brake torque is variable and substantially equal to the actual spatial average brake torque.

According to one characteristic of the invention, the determination phase uses the spatial average brake torque estimated during the estimation step to determine the spatial average motor torque.

The spatial average brake torque estimated during the estimation step is then compensated, during the compensation step, on average over an electric revolution in the controllable zone.

The invention will be better understood from the following description, which relates to an embodiment according to the present invention, given by way of non-limiting example and explained with reference to the appended schematic drawings, in which:

FIG. 2 illustrates an electrical diagram connecting an inverter 1 to an assist motor 2 in an electric power steering system of a vehicle.

Figure 1:
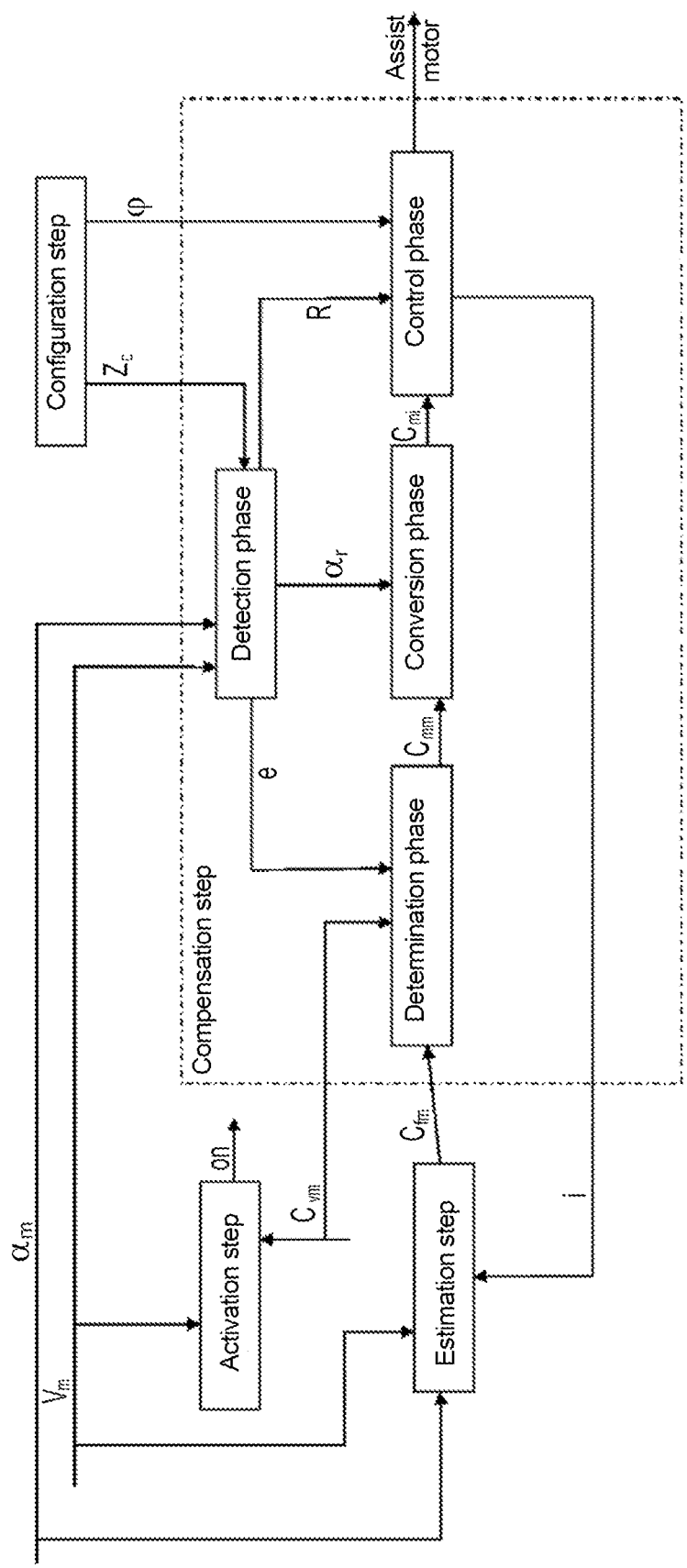
FIG. 1 is a schematic representation of a method according to the invention.

The inverter 1 is an electronic device electrically supplied by a direct current generator 11 comprising a ground portion 12 and a supply portion 13, making it possible to provide a three-phase alternating current.

The inverter 1 contains three electric lines 14, 15, 16 disposed in parallel between the ground portion 12 of the generator 11 and the supply portion 13 of the generator 11. Each electric line 14, 15, 16 includes a «low side» switching cell 117, 118, 119, that is to say a switching cell linked to the ground portion 12 of the generator 11, and a «high side» switching cell 17, 18, 19, that is to say a switching cell linked to the supply portion 13 of the generator 11. The switching cells 17, 18, 19, 117, 118, 119 are of the MOSFET type. The inverter 1 therefore comprises three «low side» switching cells 117, 118, 119 and three «high side» switching cells 17, 18, 19.

Each electric line 14, 15, 16 comprises between the «low side» switching cell 117, 118, 119 and the «high side» switching cell 17, 18, 19, a phase line U, V, W. There are therefore three phase lines U, V, W.

Each phase line U, V, W supplies a coil 28, 27, 29 of the assist motor 2.

In normal operation, electric currents flowing in the phase lines U, V, W create a rotating magnetic field determining a direction of rotation, a speed of rotation and a motor torque of the rotor 200 of the assist motor 2.

A positive direction and a negative direction are arbitrarily defined. The positive direction corresponds in the remainder of the description to the trigonometric direction.

Figure 2:
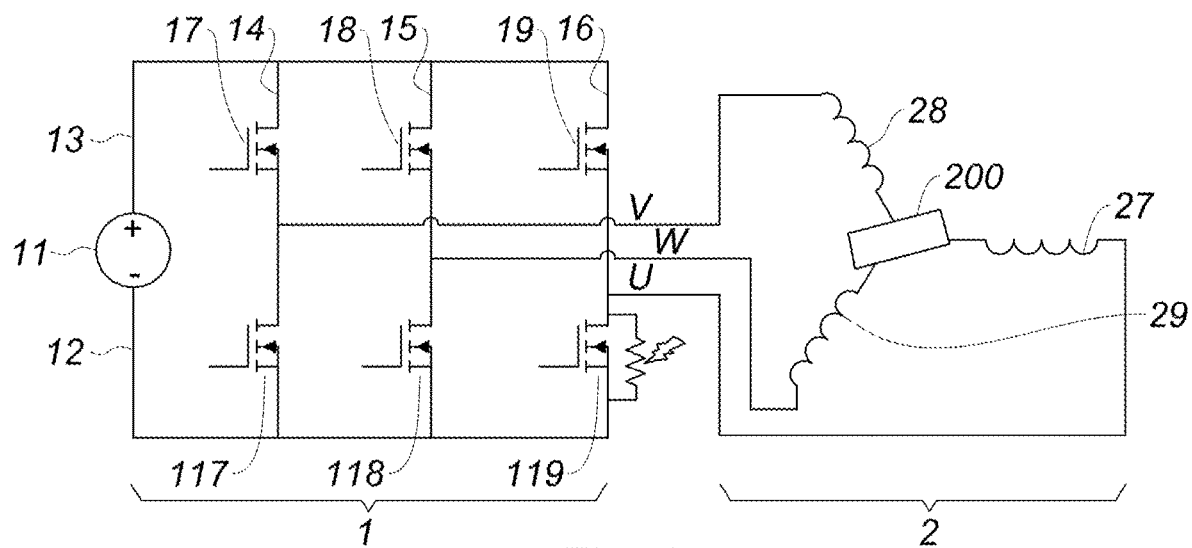
FIG. 2 is an equivalent diagram of an undriven inverter connected to an assist motor having a short-circuit type failure.

In the diagram in FIG. 2, the «low side» switching cell 119 connected to the phase line U is defective, causing a failure of the inverter 1 of the short-circuit type between the phase line U and the ground portion 12 of the generator 11. The short-circuit switching cell is in a closed position. The phase lines V and W are still functional, but the phase line U is not.

In the presence of a short-circuit type failure, electromotive forces are generated by the rotation of the rotor 200, creating a brake torque at the level of the assist motor 2.

Depending on the defective phase line U, the speed and the direction of rotation of the assist motor 2 and the ground 12 or supply 13 portion of the inverter 11 in short-circuit, it is possible to determine on an electric revolution of the assist motor 2, a controllable zone ZC and a non-controllable zone ZNC.

The non-controllable zone ZNC corresponds to an electrical angle over which the electromotive forces induce a brake torque.

Figure 3:
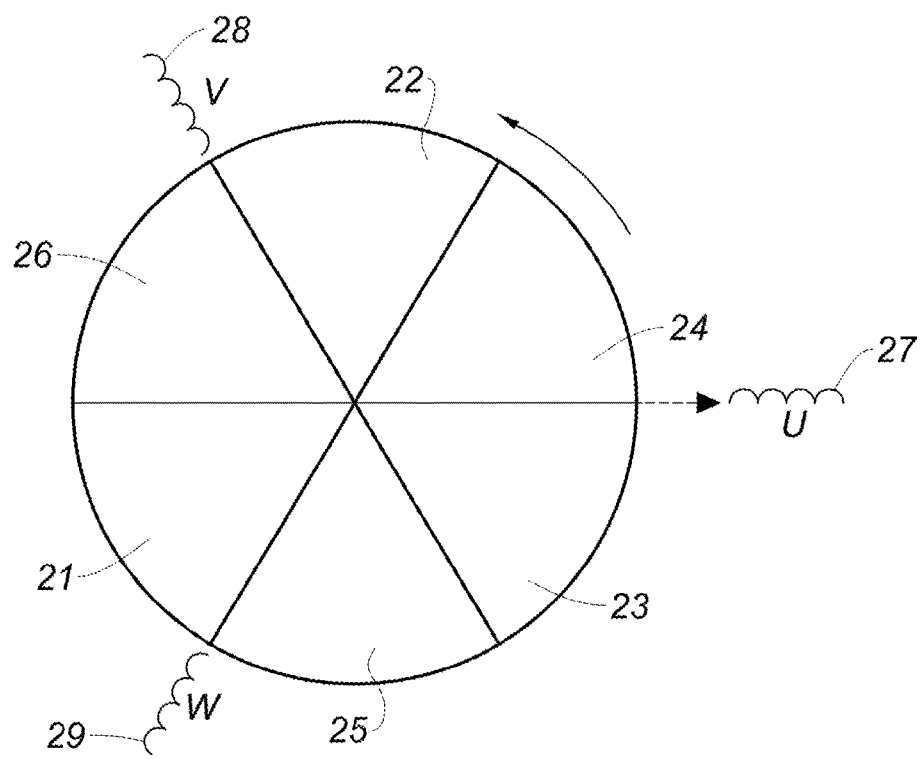
FIG. 3 is a representation of the controllable zones and of the non-controllable zones of an assist motor as a function of the short-circuit type failure and of an assist torque direction.

The controllable zone ZC corresponds to 1 electric revolution minus the electrical angle of the uncontrollable zone ZNC. An input angular position and an exit angular position $Z_c$ of the controllable zone ZC corresponding to the angular position $Z_c$ of the controllable zone ZC are defined relative to a determined coil 27, 28, 29. In FIG. 3, the angular position $Z_c$ is determined relative to the coil 27 electrically supplied by the phase line U. It is preferable to determine the angular position relative to the coil electrically supplied by the defective phase line.

As can be seen in FIG. 3, there is a first non-controllable zone 25 corresponding to the short-circuiting of the phase line U with the ground portion 12 when the assist motor 2 assists in the positive direction and corresponding to the short-circuiting of the phase line U with the supply portion 13 when the assist motor 2 assists in the negative direction.

There is a second non-controllable zone 22 corresponding to the short-circuiting of the phase line U with the ground portion 12 when the assist motor 2 assists in the negative direction and corresponding to the short-circuiting of the phase line U with the supply portion 13 when the assist motor 2 assists in the positive direction.

There is a third non-controllable zone 24 corresponding to the short-circuiting of the phase line V with the ground portion 12 when the assist motor 2 assists in the positive direction and corresponding to the short-circuiting of the phase line V with the supply portion 13 when the assist motor 2 assists in the negative direction.

There is a fourth non-controllable zone 21 corresponding to the short-circuiting of the phase line V with the ground portion 12 when the assist motor 2 assists in the negative direction and corresponding to the short-circuiting of the phase line V with the supply portion 13 when the assist motor 2 assists in the positive direction.

There is a fifth non-controllable zone 26 corresponding to the short-circuiting of the phase line W with the ground portion 12 when the assist motor 2 assists in the positive direction and corresponding to the short-circuiting of the phase line W with the supply portion 13 when the assist motor 2 assists in the negative direction.

Finally, there is a sixth non-controllable zone 23 corresponding to the short-circuiting of the phase line W with the ground portion 12 when the assist motor 2 assists in the negative direction and corresponding to the short-circuiting of the line phase W with the supply portion 13 when the assist motor 2 assists in the positive direction.

When the speed of rotation of the assist motor 2 is zero, the angle of the non-controllable zone 21, 22, 23, 24, 25, 26 is equal to an electrical angle of 60°. Thus, the controllable zone ZC corresponds to 1 electric revolution of the assist motor 2 minus the angle corresponding to the non-controllable zone ZNC, that is to say 300°.

As the rotational speed of the assist motor 2 increases, the angle of the non-controllable zone ZNC increases.

The total value of the brake torque generated in the non-controllable zone ZNC and a distribution in the non-controllable zone ZNC depends on the speed of rotation of the assist motor 2.

Thus, when the assist motor 2 is in a situation in which the phase U is in short circuit with the ground portion 12, and in the case of a closed loop monitoring, the method according to the invention as represented in FIG. 1 allows, during a configuration step, to define configuration parameters $Z_c$, φ specific to the phase line U and to the portion 12 in short circuit. The configuration parameters $Z_c$, φ are in particular the input and exit angular position $Z_c$ of the controllable zone ZC as well as the two functional phase lines φ.

In closed loop monitoring, an estimation step receives as input the rotation speed $V_m$ of the assist motor 2, a measured electrical angle $α_m$ of the motor and information concerning the phase currents available i on each functional phase line V, W.

The estimation step thus determines an estimated spatial average brake torque $C_{fm}$ exerted by the electromotive forces on the non-controllable zone ZNC. That is to say, the estimation step calculates the minimum value of torque to be provided in the following controllable zone ZC to counterbalance the brake torque exerted in the following non-controllable zone ZNC as a function of the speed of rotation.

The method according to the invention implements an activation step receiving as input the speed of rotation $V_m$ of the assist motor 2 and the measured steering wheel torque $C_{vm}$.

The activation step allows activating a step of compensating the spatial average brake torque when the measured steering wheel torque $C_{vm}$ and the speed of rotation $V_m$ of the assist motor 2 are greater than a predetermined value, for example 5 N·m for the measured steering wheel torque $C_{vm}$ and 50 rpm for the speed of rotation $V_m$ of the assist motor 2, and when they are in the same direction. For this, the activation step sends an activation signal on. When the conditions are not fulfilled, that is to say when the activation signal is not emitted, the activation step no longer drives the inverter 1 which is then in a deactivated state, called deactivated inverter switching. This activation step can also receive the phase currents available i on each functional phase line V, W.

The compensation step includes a detection phase, a determination phase, a conversion phase and a control phase.

The detection phase receives as input the measured electrical angle $α_m$ and a speed of rotation $V_m$ of the assist motor 2 as well as the input and exit angular position $Z_c$ of the controllable zone ZC determined during the configuration step.

The detection phase determines a relative electrical position $α_r$ of the motor 2, unsigned, relative to the input of the controllable zone ZC and also defines a direction of the assist torque R of the functional phase lines V, W as a function of the direction of rotation of the assist motor 2.

Finally, the detection phase activates, via an activation signal e, the realization of the determination phase at each electric revolution.

The determination phase receives as input the activation signal e of the detection phase, the measured steering wheel torque $C_{vm}$ and the estimated spatial average brake torque $C_{fm}$.

The determination phase calculates the average motor torque $C_{mm}$ to be exerted on the controllable zone ZC so as to maintain an admissible steering torque for the driver. The determination phase takes into account the measured steering wheel torque $C_{vm}$ as in a failure-free situation and compensates the estimated spatial average brake torque $C_{fm}$.

The conversion phase transforms the average motor torque $C_{mm}$ to be exerted on the controllable zone ZC into an instantaneous motor torque $C_{mi}$ as a function of the relative electrical position $α_r$ of the assist motor 2. The average motor torque $C_{mm}$ is equal to the integral of the instantaneous motor torque $C_{mi}$ on the controllable zone ZC. The average motor torque $C_{mm}$ is distributed over the extent of the controllable zone ZC, in our case from 0° to 300°, according to a setpoint curve shown in FIG. 4. The non-controllable zone ZNC corresponds to the electrical angle ranging from 300° to 360°.

Figures 4, 5:
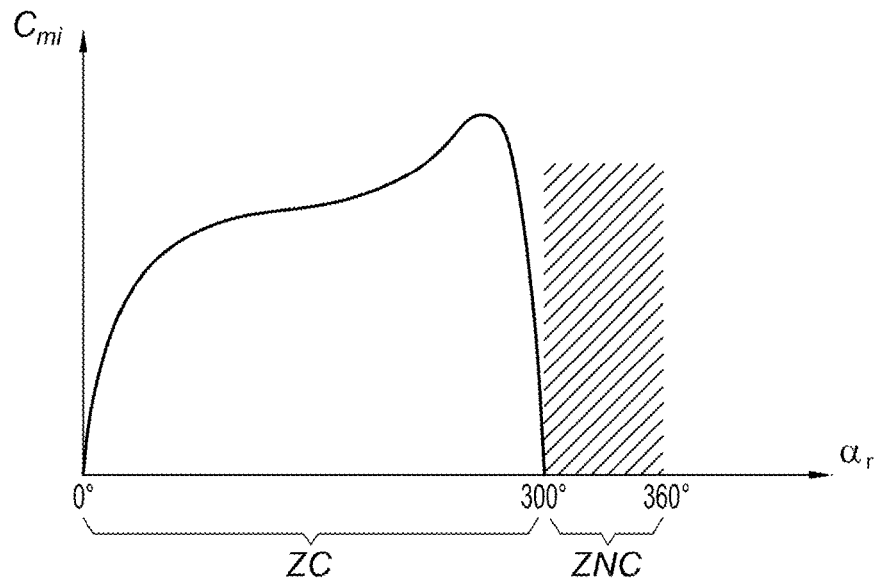
FIG. 4 is a representation of a setpoint curve representing an instantaneous motor torque as a function of a relative electrical position of the assist motor with respect to the controllable zone.
FIG. 5 represents a switching table of an inverter.

The control phase receives the direction of the assist torque R of the assist motor, the two functional phases V, W and the instantaneous motor torque $C_{mi}$ so as to control the two functional phase lines V, W of the assist motor 2 via the inverter 1 according to a switching table as represented in FIG. 5.

There are 21 possible switches of the inverter depending on the activation signal and the defective switching cell.

A switching determines a position of each of the switching cells of the inverter.

For example, the switching C31 defines that the «low side» switching cell of the phase line U is in the closed position, that the «high side» switching cell of the phase line U is in the open position, the «low side» switching cell of the phase line V is in the closed position, the «high side» switching cell of the phase line V is in the open position, the «low side» switching cell of the phase line W is in the closed position, the «high side» switching cell of the phase line W is in the open position.

The deactivated switching inverter is passive switch C0 in which the 6 switching cells are in an open position. In the uncontrollable zone, the inverter is in the deactivated switching inverter.

In the controllable zone, the inverter is successively in 2 possible active switches.

For a failure as represented in FIG. 2, that is to say a failure by short-circuiting the phase line U with the ground portion 12, the «low side» switching cell of the line phase U is closed. Thus, the inverter can be controlled using one of the active switches C31, C34, C35, C36, C205, C206, C209, C210, that is to say the active switches whose «low side» switching cell 119 of the phase line U is in the closed position.

Moreover, there are possible 'active' switches C32, C33, C37, C38, C207, C208, C211, C212 corresponding to the switches available when the phase line U is short-circuited with the supply portion 13.

There are possible 'active' switches C31, C32, C36, C37, C201, C202, C210, C212 corresponding to the switches available when the phase line V is short-circuited with the ground portion 12.

There are possible 'active' switches C33, C34, C35, C38, C203, C204, C209, C211 corresponding to the switches available when the phase line V is short-circuited with the supply portion 13.

There are possible 'active' switches C31, C32, C33, C34, C201, C203, C205, C207 corresponding to the switches available when the phase line W is short-circuited with the ground portion 12.

There are possible 'active' switches C35, C36, C37, C38, C202, C204, C206, C208 corresponding to the switches available when the phase line W is short-circuited with the supply portion 13.

At each electric revolution when the activation signal is emitted, the inverter will successively go through a monitoring phase in the controllable zone using all or part of the 8 control switches available and in a passive phase in the non-controllable zone corresponding to the switch C0.

Of course, the invention is not limited to the embodiments described and represented in the appended figures. Modifications remain possible, in particular from the point of view of the constitution of the various elements or by substitution of technical equivalents, without thereby departing from the scope of protection of the invention.

The invention claimed is:

1. A method for driving a power steering system of a vehicle, comprising a steering wheel, and an inverter electrically supplying an assist motor, when a short-circuit type failure is detected between a phase of the assist motor and an electric line of the inverter wherein it comprises:
    a configuration step intended to determine for a magnetic field of the assist motor a controllable zone and a non-controllable zone that are defined by an electrical angle and a direction of rotation and a rotational speed of the assist motor,
    a step of compensating a spatial average brake torque in the controllable zone, the compensation step comprising:
    a phase for detecting a relative electrical position of the assist motor ($\alpha_r$) with respect to the controllable zone,
    a phase for determining a spatial average motor torque ($C_{mm}$) as a function of the measured steering wheel torque ($C_{vm}$),
    a phase for converting the space average motor torque ($C_{mm}$) into an instantaneous motor torque ($C_{mi}$),
    a phase for controlling the phase currents of the assist motor.

2. The driving method according to claim 1, comprising an activation step comparing a direction of rotation of the steering wheel with the direction of rotation of the assist motor.

3. The driving method according to claim 2, wherein the activation step compares a steering wheel torque ($C_{vm}$) and/or the rotational speed of the assist motor ($V_m$) with a predetermined threshold.

4. The driving method according to claim 1, wherein the configuration step determines two phases ($\varphi$) of the assist motor not influenced by the failure.

5. The driving method according to claim 1, wherein the detection phase triggers an implementation of the phase for determining a spatial average motor torque ($C_{mm}$).

6. The driving method according to claim 1, wherein the conversion phase implements a setpoint curve representing the instantaneous motor torque ($C_{mi}$) as a function of the relative electrical position of the assist motor ($\alpha r$) relative to the controllable zone.

7. The driving method according to claim 1, wherein the control phase successively uses a switching, called «deactivated inverter switching» (C0), a first switching group, and a second switching group for carrying out vector monitoring of the phase currents.

8. The driving method according to claim 1, comprising a step of estimating the spatial average brake torque induced by the failure in the non-controllable zone.

9. The driving method according to claim 8, wherein the determination phase uses the estimated spatial average brake torque ($C_{fm}$) during the estimation step to determine the spatial average motor torque ($C_{mm}$).

* * * * *